(12) United States Patent
Zhang et al.

(10) Patent No.: US 10,193,978 B2
(45) Date of Patent: Jan. 29, 2019

(54) DISTRIBUTED NETWORK NODE OPERATION SYSTEM BASED ON OPERATION CONTROL UNIT

(71) Applicant: CHONGQING GKTSINGCHIP INDUSTRY TECHNOLOGY CO., LTD., Chongqing (CN)

(72) Inventors: Sheng Zhang, Guangdong (CN); Yantong Wang, Guangdong (CN); Ying Wu, Guangdong (CN); Mansuo Zhou, Guangdong (CN)

(73) Assignee: CHONGQING GKTSINGCHIP INDUSTRY TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/468,501

(22) Filed: Mar. 24, 2017

(65) Prior Publication Data
US 2017/0195406 A1 Jul. 6, 2017

Related U.S. Application Data

(63) Continuation of application No. PCT/CN2016/071201, filed on Jan. 18, 2016.

(30) Foreign Application Priority Data

Jun. 15, 2015 (CN) .......................... 2015 1 03335779

(51) Int. Cl.
*G06F 15/16* (2006.01)
*H04L 29/08* (2006.01)
(Continued)

(52) U.S. Cl.
CPC ........ *H04L 67/1097* (2013.01); *G06F 9/4843* (2013.01); *G06F 9/5027* (2013.01);
(Continued)

(58) Field of Classification Search
CPC .......................... H04L 41/0806; H04L 45/64
See application file for complete search history.

(56) References Cited

U.S. PATENT DOCUMENTS 6,809,836 B1 * 10/2004 Nobuta .............. H04N 1/33315
358/1.15
7,467,194 B1 * 12/2008 Slaughter .............. H04L 67/104
709/206

(Continued)

OTHER PUBLICATIONS

State Intellectual Property Office of the P.R. china (ISR/CN), "International Search Report for PCT/US2016/071201", China, dated Mar. 24, 2016.

*Primary Examiner* — Shean Tokuta
(74) *Attorney, Agent, or Firm* — Locke Lord LLP; Tim Tingkang Xia, Esq.

(57) ABSTRACT

A distributed network node operation system based on an operation control unit. The operation system operates on a network node and interacts with a data link layer, and includes: an application interface unit, a network information management unit, a file unit, a task scheduling unit and a device drive management unit. The application interface unit packages the services provided by the file unit, the task scheduling unit and the network information management unit into an interface for interacting with the protocol stack management unit; the network information management unit interacts with the data link layer to perform link scheduling for transmitting information and updating node data; the file unit manages and stores file information; the task scheduling unit manages hardware resources; the device drive management unit manages underlying device application drives, and invokes different protocol stack library functions through different application drives.

13 Claims, 5 Drawing Sheets

(51) Int. Cl.
  *G06F 9/48* (2006.01)
  *G06F 9/50* (2006.01)
  *H04L 12/911* (2013.01)
  *H04L 29/06* (2006.01)
  *H04W 12/00* (2009.01)
  *H04W 4/70* (2018.01)
  *G06F 17/30* (2006.01)
  *H04W 84/18* (2009.01)

(52) U.S. Cl.
  CPC .............. *H04L 47/70* (2013.01); *H04L 63/00* (2013.01); *H04L 67/06* (2013.01); *H04L 67/10* (2013.01); *H04L 67/12* (2013.01); *H04L 67/26* (2013.01); *H04L 69/321* (2013.01); *H04L 69/322* (2013.01); *H04L 69/324* (2013.01); *H04W 12/00* (2013.01); *G06F 17/30094* (2013.01); *H04W 4/70* (2018.02); *H04W 84/18* (2013.01)

(56) References Cited

U.S. PATENT DOCUMENTS

| | | | | |
|---|---|---|---|---|
| 7,920,512 B2* | 4/2011 | Maltseff | | H04W 8/005 370/328 |
| 7,961,740 B2* | 6/2011 | Flammer, III | | H04W 40/248 370/315 |
| 8,516,470 B1* | 8/2013 | van Rietschote | | H04L 67/1095 717/168 |
| 9,436,748 B2* | 9/2016 | King, III | | G06F 17/30206 |
| 9,444,722 B2* | 9/2016 | Mosko | | H04L 45/123 |
| 9,450,817 B1* | 9/2016 | Bahadur | | H04L 45/64 |
| 9,923,802 B2* | 3/2018 | Wong | | H04L 45/021 |
| 2005/0021883 A1* | 1/2005 | Shishizuka | | H04N 1/00204 710/20 |
| 2006/0206684 A1* | 9/2006 | Basso | | H04L 49/90 711/202 |
| 2006/0248208 A1* | 11/2006 | Walbeck | | H04L 29/06 709/230 |
| 2010/0189107 A1* | 7/2010 | Corson | | H04L 45/02 370/392 |
| 2010/0269112 A1 | 10/2010 | Lopez-Ramos et al. | | |
| 2011/0055458 A1* | 3/2011 | Kuehne | | G06F 12/0246 711/103 |
| 2011/0085494 A1* | 4/2011 | Ji | | H04W 40/12 370/328 |
| 2011/0276633 A1* | 11/2011 | Marchisio | | H04L 67/104 709/205 |
| 2012/0134361 A1* | 5/2012 | Wong | | H04L 45/021 370/392 |
| 2012/0163233 A1* | 6/2012 | Lee | | H04L 12/437 370/254 |
| 2012/0209808 A1* | 8/2012 | Tien | | H04L 67/1095 707/622 |
| 2013/0155925 A1* | 6/2013 | Priyantha | | H04W 52/0261 370/311 |
| 2013/0232208 A1* | 9/2013 | Lao | | H04L 51/16 709/206 |
| 2014/0045446 A1* | 2/2014 | Assuncao | | H04M 3/5116 455/404.1 |
| 2014/0280605 A1* | 9/2014 | Zhang | | H04L 67/1095 709/205 |
| 2015/0074168 A1* | 3/2015 | Hartman | | G06F 17/30091 709/201 |
| 2016/0192211 A1* | 6/2016 | Park | | H04W 24/02 370/252 |
| 2017/0195406 A1* | 7/2017 | Zhang | | H04L 67/10 |
| 2017/0201462 A1* | 7/2017 | Ji | | H04L 47/32 |

* cited by examiner

DISTRIBUTED NETWORK NODE OPERATION SYSTEM BASED ON OPERATION CONTROL UNIT

CROSS REFERENCE TO RELATED APPLICATIONS

The present application is a continuation of international application no. PCT/CN2016/071201, filed on Jan. 18, 2016, which claims priority to China Patent Application no. 2015103335779, filed on Jun. 15, 2015, both of which are hereby incorporated by reference in their entireties.

TECHNICAL FIELD

The present invention application relates to a distributed network node operation system applied to an Internet of Things, and in particular, to a distributed network node operation system based on an operation control unit.

BACKGROUND ART

Internet of Things is network for realizing informationization, remote management control and intelligentization by linking sensors, controllers, machines, persons and things together in a new manner through communication technology such as a local network or Internet to form links between people and things and between things. With the rapid development of Internet of Things technology, more and more articles are networked. However, intercommunication can hardly be achieved due to different standards of information systems built in different regions in different stages, and the so-called "information isolated islands" are formed. The user needs a uniform platform in which a plurality of networks and a plurality of protocols are compatible to realize intercommunication.

As one way for implementing the Internet of Things, a Wireless Sensor Network (WSN) is a wireless network consisting of a large number of static or mobile sensors in a self-organizing and multi-hop manner to collaboratively sense, acquire, process and transmit information of objects sensed in a geographic region covered by the network and finally send this information to the owner of the network.

A wireless sensor network is generally equipped with an operation system, and the operation system of the wireless sensor network is intended to provide a good user interface for the user. An operation system with good performance can allow optimal and reasonable resource allocation, and stable and reliable work during the operating process of the whole system.

The main current wireless sensor network operation systems are as below:

(1) TinyOS, an open-source embedded operation system developed by University of California, Berkeley, which can rapidly implement various applications based on the architecture mode of parts, and is currently mainly used in the field of wireless sensor network.

(2) MiniOS, a multi-task operation system based on sensor network node hardware environment, which provides an easy universal development platform for users;

(3) MantisOS, a micro operation system facing sensor networks developed by University of Colorado, which provides multi-frequency communication and suitable for multi-task sensor nodes.

Among these, the most popular one is TinyOS, and most of the researches and developments in sensor network application use the software system design of TinyOS. However, TinyOS adopts a compromised method between functions and hardware restriction. Due to the limit on memory space, TinyOS uses the first-in-first-out scheduling strategy for task management, which can hardly meet the application requirement of the increasingly complicated sensor systems. With the development of micro controllers, the processing ability and storage capacity are gradually increased, and a single-task operation system cannot make full use of system resources any more for meeting complicated user demands.

Moreover, an embedded operation system widely used in the Internet of Things system generally includes a underlying drive software related with hardware, system kernel, device drive interface, communication protocol, graphic interface, standardized browser, etc. The embedded operation system is responsible for allocation of all software and hardware resources, task scheduling of the embedded system, and controlling and coordinating concurrent activities. The currently main embedded operation systems are as blow:

(1) Windows CE: it is an open and scalable 32-bit embedded operation system developed by Microsoft, and a typical embedded system based on Windows CE is generally designed for a certain specific use, and works without being online. It requires the operation system to be used to have small size and have an in-built response function for interruption.

(2) VxWorks operation system: it is an embedded real-time operation system designed and developed by WindRiver. VxWorks has a cuttable microkernel structure; highly efficient task management; flexible inter-task communication; interruption processing at microsecond speed; supports POSIX 1003. 1 b real-time expansion standard; supports multiple physical mediums and standard, complete TCP/IP network protocols, etc. however, the costs for developing and maintaining the software are too high, and the number of hardware that can be supported is limited.

(3) μC/OS—II: it is a preemptive multi-task real-time operation system based on priority, and is specially designed for embedded application, and it can be used in 8-bit, 16-bit and 32-bit single chip microcomputers or digital signal processors. SinceμC/OS—II is only a real-time kernel, it means that unlike other real-time systems, it can only provide the users with some API function interface, and there is still a lot of work to be done by the users themselves.

From the view of the existing embedded operation systems, most of the embedded operations systems face the control process, and emphasize the control and scheduling for system resources, but the space for secondary development and improvement for users is very small, and thus cannot meet the requirement for the development of the Internet of Things.

The disclosure of the above background art is only for assisting the understanding of the concept and technical solution of the present invention application, and does not necessarily belong to the prior art of the present invention application. The above background art shall not be used to evaluate the novelty and inventiveness of the present application without any explicit evidence showing that the above content has been disclosed before the filing date of the present invention application.

SUMMARY OF THE INVENTION

The (main) object of the present invention application lies in that a distributed network node operation provided by the present patent faces a communication without changing the architecture of the network protocol macroscopically, and is transparent to the upper-layer applications; plentiful user interfaces are provided for facilitating secondary development and improvement.

Compared with the prior art, the beneficial effects of the present invention application include: the distributed network node operation system based on an operation control unit according to the present invention can be applied to underlying devices of different communication modes and networking modes, the corresponding application drives of these devices may be invoked, and library functions of different protocol stacks may be invoked for routing and application management of the network, thereby making a plurality of communication modes and protocols compatible. Therefore, the operation system of the present application is compatible with a plurality of networks and a plurality of protocols, thus realizing intercommunication.

SPECIFIC EMBODIMENTS

The present invention application will be further described below with reference to the drawings in conjunction with specific examples. It should be noted that the following description is only for illustration, and is not intended to limit the scope and utilization of the present invention application.

Non-restrictive and non-exclusive examples will be described with reference to the following drawings, in which the same reference signs indicate the same parts, unless specifically explained otherwise.

A person skilled in the art shall appreciate that various modification can be made to the description, and thus the examples are only used to describe one or more specific embodiments.

Figure 1:
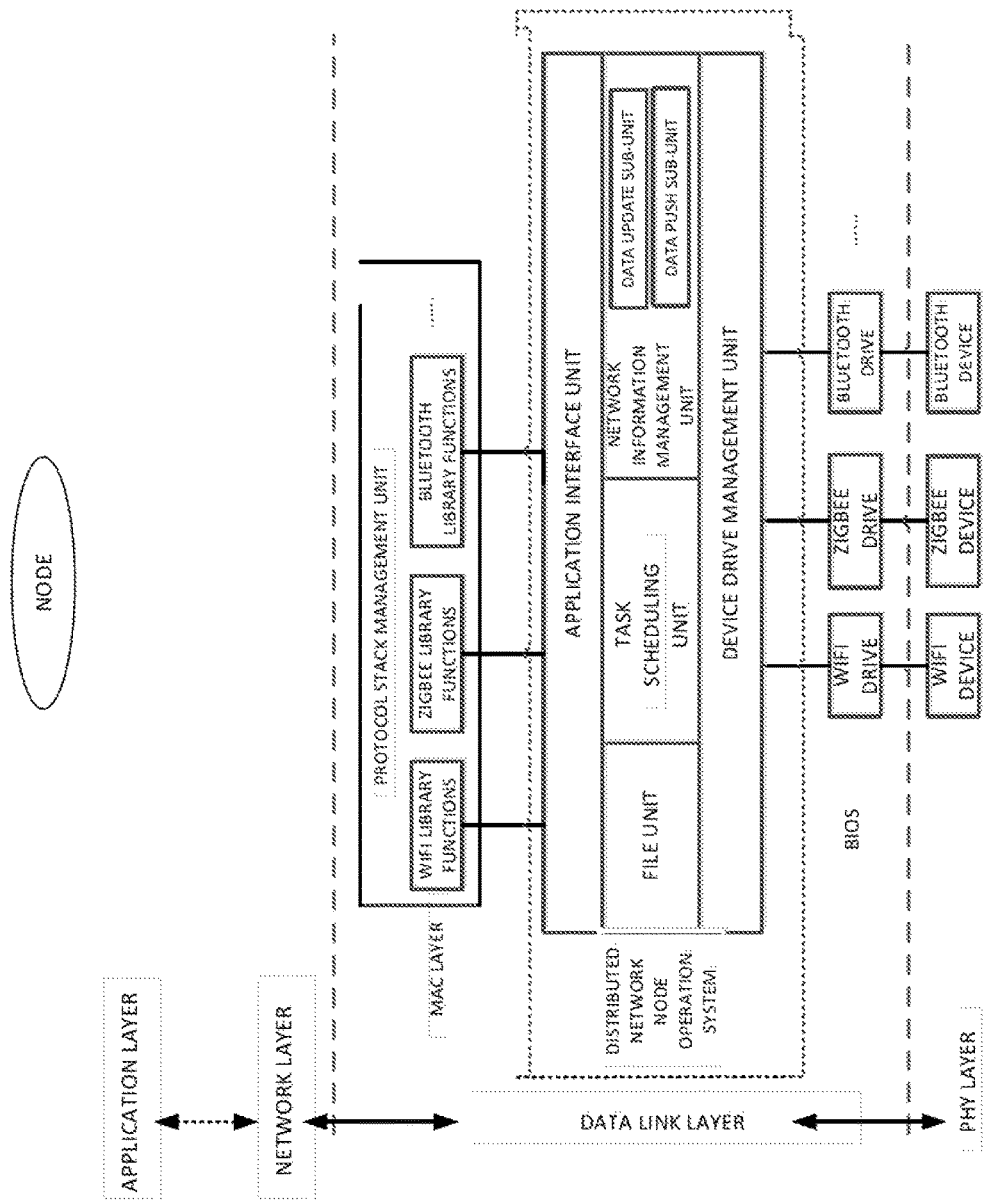
FIG. 1 illustrates the system of a distributed network node operation system based on an operation control unit according to the present invention.

FIG. 1 illustrates a distributed network node operation system based on an operation control unit according to the present invention implanted on distributed network nodes. As shown in FIG. 1, the distributed network node operation system based on an operation control unit according to the information of the present invention is located between an upper-layer application and an underlying device. The upper-layer application is located above the operation system, and it is a set of applications providing a certain particular service for the user.

Taking the Internet of Things as an example, each node may represent one terminal in the Internet of Things. For example, in an Internet of vehicles, each node may represent a vehicle. In an Internet of Things consisting of a plurality of wearable smart devices, each node may represent one wearable smart device, such as smart watch or smart glasses.

As shown in FIG. 1, the distributed network node operation system according to the present invention directly interacts with a data link layer, and thus can directly perform link scheduling with a network layer through the data link layer to transmit node information and update the data of the node or between nodes. The distributed network node operation system according to the present invention may be directly located in the data link layer, or be embedded in the data link layer, to achieve direct interaction with the data link layer.

The distributed network node operation system based on an operation control unit according to the present invention includes: an application interface unit, a network information management unit, a file unit, a task scheduling unit and a device drive management unit.

The network information management unit interacts with the data link layer to perform link scheduling for transmitting information and updating node data. Specifically, according to an example of the present invention, the network information management unit is configured to, when the data acquired by the acquisition nodes are changed, control the acquisition nodes to plan a push path according to a routing table, encapsulate the data acquired this time, end information abstract in a block chain and the push path, and actively push the encapsulated information to a first neighbor node where network communication can reach, and write the data acquired this time into the end of the block chain of the acquisition nodes, and finally send the encapsulated information to a cloud. The network information management unit is in charge of management of network information. According to an example of the present invention, it may include a data push sub-unit which is responsible for automotive push of information between nodes and a data update sub-unit which is responsible for update of data between the nodes.

In an example, information abstract includes time stamps, a number of acquisition nodes and tags of the acquisition nodes.

In the present invention, the first neighbor node refers to the node in the one-hop communication range of the acquisition node. The incorporation herein means that when the neighbor node receives two or more pieces of information with the same time stamp but sent by different acquisition node tags, the neighbor node combines this information into a format of time stamp, the number of acquisition nodes, the tags of the acquisition nodes, data, the tags of the acquisition nodes data . . . . Wherein, the number of the collecting nodes is determined according to the number of the tags of the acquisition nodes, each tag of acquisition node is followed immediately by its data, and the order of the tags of the acquisition nodes may be agreed in advance, for example in an ascending order, and the like.

After the first neighbor node receives the encapsulated information shared by the acquisition node, the network information management unit incorporates the time stamp of this time, the tags of the acquisition node and the data in the encapsulated information into the block chain in an order according to the time stamps; meanwhile it actively pushes the received encapsulated information to the second neighbor node. In such a way, the second neighbor node can actively push the encapsulated information to the third neighbor node. The number of times of active push may be determined according to the specific condition of the network.

The application interface unit is a set of application interfaces for encapsulating the services provided by the file unit, the task management unit and the information management unit into a programmatic interface available to the upper-layer applications and providing an interface for interacting with the library functions of the protocol stack. The application interface unit converts the services provided by the file unit, the task scheduling unit and the network information management unit to a programmatic interface available to the upper-layer applications.

The file unit is responsible for managing and storing file information, organizing and allocating the space of the file storage device, and storing files and protecting and searching the stored files.

The task scheduling unit is responsible for managing the hardware resources. According to an example of the present invention, the e task scheduling unit includes processor management, memory management and IO (input and output devices) management. A processor management sub-unit is responsible for allocating and controlling processors. A memory management sub-unit is responsible for allocation and recycle of memory. An IO device management sub-unit is responsible for allocation and manipulation of IO devices.

The device drive management unit is responsible for managing the underlying application drives, and invoking different protocol stack library functions through different application drives, thus making a plurality of communication modes and protocols compatible.

The application interface unit of the distributed network node operation system is also interfaced with a protocol stack management unit.

The protocol stack management unit encapsulates a set of library functions of the protocol stacks of different network protocols. The application interface unit further provides an interface for interacting with the library functions of the protocol stacks. The protocols include but not limited to WiFi, ZigBee, Bluetooth, etc. The present invention application enables the protocol stack to encapsulate library functions, and the operation system provides a scheduling interface for the protocol stack. The operation system supports underlying devices of different communication modes and networking modes, and can invoke the application drives of these devices. The library functions of different protocol stacks are invoked for routing and application management of the network, making a plurality of communication modes and protocols compatible. This ensures universality of the network. According to an example of the present invention, the protocol stack management unit may be located in a MAC layer.

Figure 2:
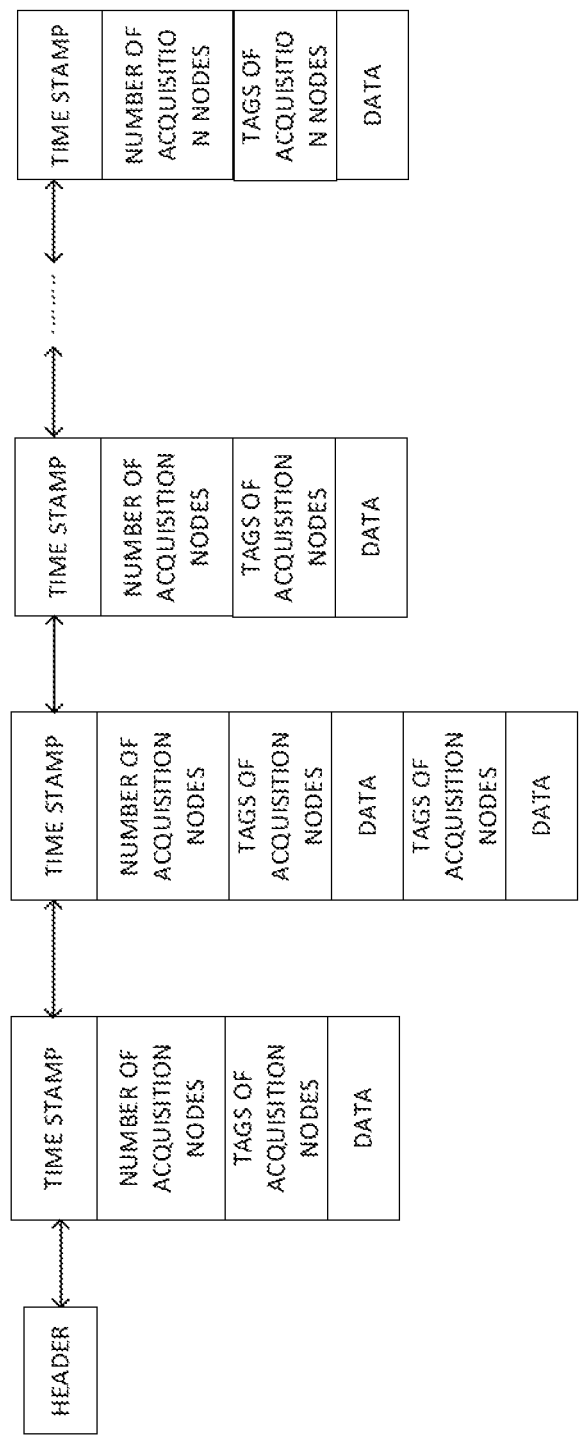
FIG. 2 illustrates a block chain according to the present invention.

According to an example of the present invention, the data of the network node is stored in a form of block chain table, as shown in FIG. 2.

Information abstracts contains time stamp, the number of acquisition nodes and tags of the acquisition nodes.

The first neighbor node refers to the node within one-hop communication range of the acquisition node

| Push path | Time stamp at the end of the block chain | Number of acquisition nodes at the end | Tags of acquisition nodes at the end | Time stamp of this time | Tags of acquisition nodes | Data |
|---|---|---|---|---|---|---|

This format is only illustration of the network layer. Please see the corresponding network protocol for other parts such as check. Since other parts of the data packet are not within the protection scope of the present invention, they are not listed herein.

As shown in FIG. 2, a block chain is a chain table structure for storing history data, and achieves the purpose of recording by recording time, the number of acquisition nodes, the tags of the acquisition nodes and data. Wherein, a block chain includes a plurality of the above information abstracts.

Different blocks have different sizes, because there may be several nodes acquiring data at a certain time point, and the number of the acquisition nodes is required to record the number of nodes with changed data at this moment.

Preferably, the information abstracts of the block chain table are sequenced in an order from old to new according to the time stamps.

According to a specific example, when the data of the network node are stored in the manner of block chain table, after the network node receives the information, the received information tag is compared with the node tag in the existing block chain table. If there are the same node tags, a new data block is used to replace the old one in an order according to the time stamps; if there is no same node tag, a new data block is entirely incorporated into the end of the block chain table.

Figure 3:
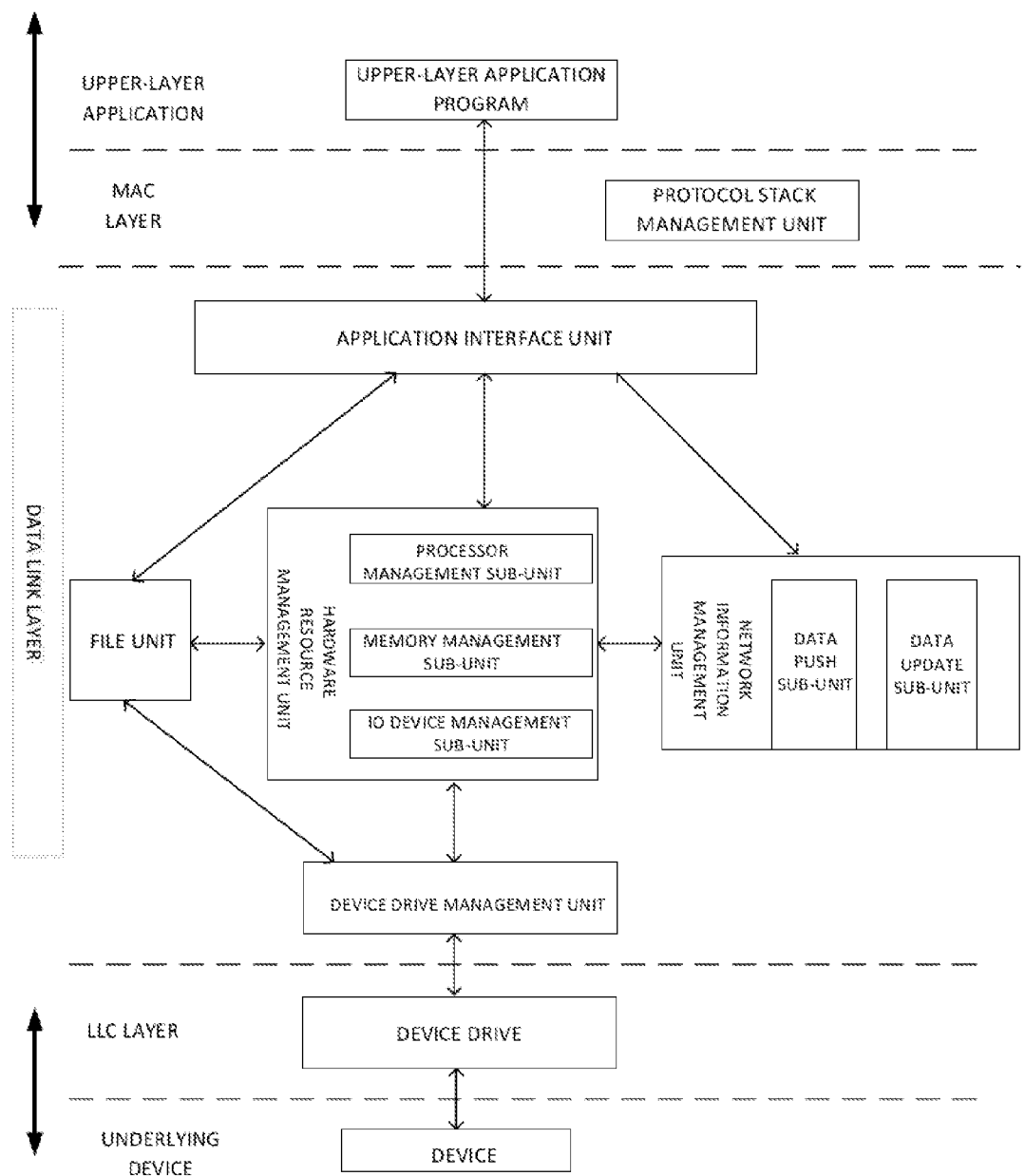
FIG. 3 illustrates the system of a distributed network node operation system based on an operation control unit according to another example of the present invention.

FIG. 3 illustrates a specific example of the distributed network node operation system including an operation control unit implemented on each network node according to the present invention.

As shown in FIG. 3, the distributed network node operation system based on an operation control unit according to the present invention is implemented between an underlying device and an upper-layer application. In particular, the data link layer may be divided into a logic link sub-layer (LLC layer) and a media access control sub-layer (MAC layer). According to an example of the present invention, the distributed network node operation system according to the present invention may be located between the logic link sub-layer (LLC layer) and the media access control sub-layer (MAC layer). According to another example of the present invention, the distributed network node operation system according to the present invention may also be incorporated with the logic link sub-layer (LLC layer) and the media access control sub-layer (MAC layer).

Since the distributed network node operation system according to the present invention works between the data link layer and the physical layer, the architecture of the network protocol is not changed macroscopically and is transparent to the upper-layer applications; plentiful user interfaces are provided for facilitating secondary development and improvement.

In the present example, the network information management unit is responsible for managing the data frames transmitted between the data link layer and the physical layer, and selectively storing the data frames according to the corresponding application requirements.

In this example, the network information management unit selectively data frames according to the corresponding application requirements, and the data frames are stored in the file unit. The file unit distinguishes different data versions by recording a particular tag. The so-called particular tag includes but not limited to time stamp, event drive.

In this example, the hardware resource management unit is also responsible for scheduling various tasks in the distributed network node operation system. The scheduling algorithm includes real-time preemption scheduling mode of event triggering. Due to direct interaction with the data link layer, the distributed network operation system of the present patent can achieve real-time preemption scheduling mode based on event triggering. When the data frames in the data link layer need to be transmitted to the physical layer, or the bit streams received by the physical layer need to be transmitted to the data link layer, tasks of corresponding priorities will be established in the network information management unit and uniformly scheduled by the task scheduling unit to ensure that respond can be made to the essential tasks immediately. As for the established tasks of different priorities, in addition to transmission of data, other processing may also be made to the data according to the actual application requirements so as to facilitate secondary development and application.

The device drive management unit is responsible for managing application drives of the underlying devices, selecting the corresponding application drives according to different underlying devices, and performing the corresponding initiation. By invoking different underlying drives, different underlying hardware devices are supported.

In this example, by means of device drive management and protocol stack management, a plurality of networking modes, including but not limited to star network, mesh network, loop network and other network topology structures, can be supported; a plurality of wireless communication protocols including but not limited to WiFi, ZigBee and Bluetooth can also be supported through the LLC layer and the MAC layer. Depending on the underlying devices of different communication modes and networking modes, the corresponding application drives of these devices may be invoked, and library functions of different protocol stacks may be invoked for routing and application management of the network, thereby making a plurality of communication modes and protocols compatible. Therefore, the operation system of the present application is compatible with a plurality of networks and a plurality of protocols, thus realizing intercommunication.

Figure 4:
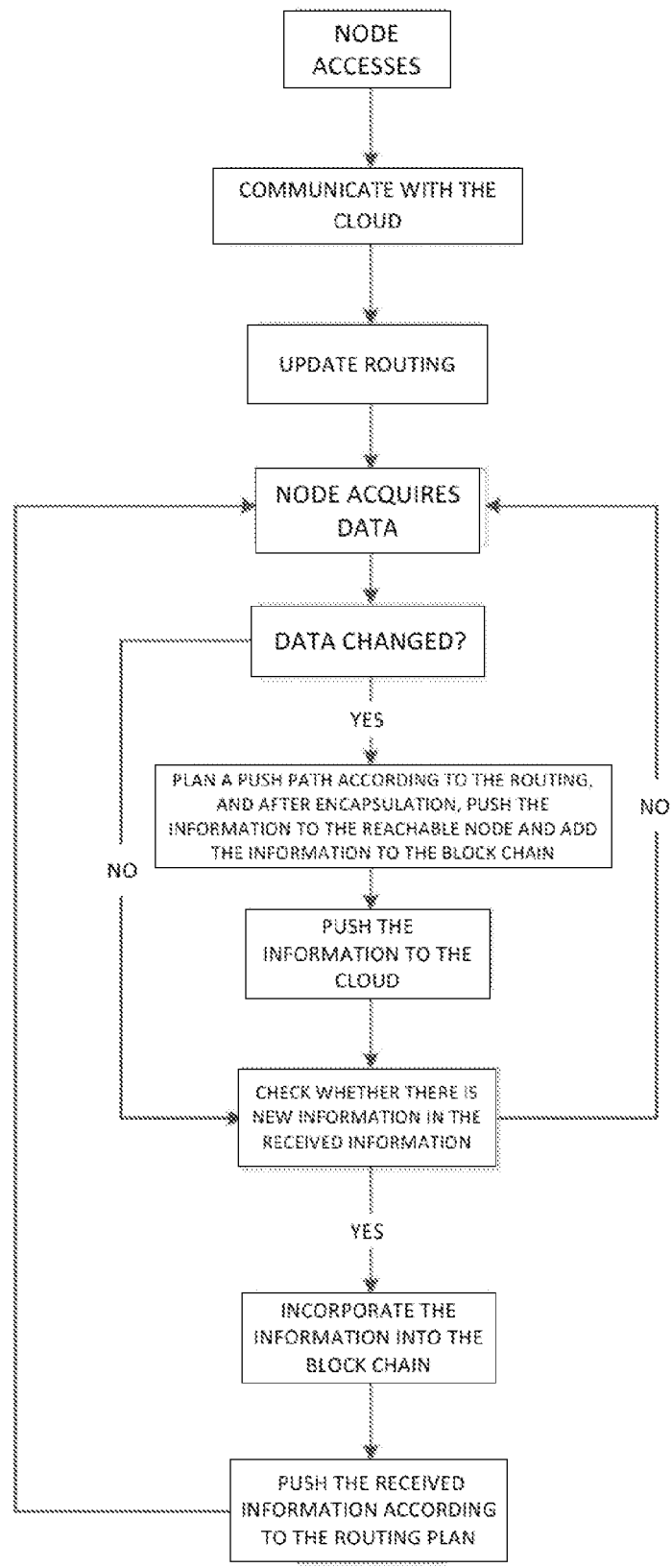
FIG. 4 is a flowchart of a method for active information push by a network node according to the present invention.

FIG. 4 is a flowchart of a method for active information push by a network node according to the present invention. The above node operation system operates on the network node, and the operation system directly interacts with the data link layer. The operation system includes: an application interface unit, a network information management unit, a file unit, a task scheduling unit and a device drive management unit.

As shown in FIG. 4, in another example, the method for active information push includes the following steps:

Step one: a network node accesses a network;

Step two: the node communicates with the cloud, and requests for updating routing; communicating with the cloud according to the present invention means receiving data from other nodes in the network. Since the node operation system of the present invention operates each network node, and when the data of the node are changed, data may be actively pushed to other nodes in an event driven manner.

Step three: receive the updated routing from the cloud;

Step four: the node acquires data;

Step five: detect whether the acquired data are chanted or not, if yes, proceed to step six; otherwise, proceed to step eight;

Step six: the node plans a push path according to the routing by means of the network information management unit, and after encapsulation, it pushes the information to the reachable node and adds the information to the block chain; the "reachable node" here may refer to the first neighbor node;

Step seven: the node sends data to the cloud, i.e., actively push the data to other nodes;

Step eight: the node checks whether there are new data in the cached received data, and if there is no new data, return to step four; if there are new data, proceed to step nine;

Step nine: the node incorporates the newly received information into the block chain;

Step ten: the received information is continually pushed to other nodes according to the routing plan, return to step four.

After the encapsulated information is received the encapsulated information are distinguished according to information abstracts. All data have copies at the cloud, and are stored in the manner of block chain and are distinguished according to information abstracts. Data push is performed in a manner using change of acquired data as the event driving, i.e., once the acquired data are changed, the node has to perform one data push.

During the process of active data push, if the time stamp at the end of the block chain, a number of end acquisition nodes and tags of end acquisition nodes in the information received by the neighbor node are not consistent with a block in a block chain of a neighbor node, then the neighbor node sends to the cloud a request containing information abstracts for distinguishing information versions; after receiving the request, the cloud sends a block of a corresponding version according to the information abstracts and all blocks after the block to the neighbor node.

When the neighbor node receives more than two information versions with the same information abstract and these information versions have different contents, the neighbor node sends to the cloud a request containing information abstracts for distinguishing data versions; after receiving the request, the cloud sends a block of a corresponding version according to the information abstracts and all blocks after the block to the neighbor node.

Figure 5:
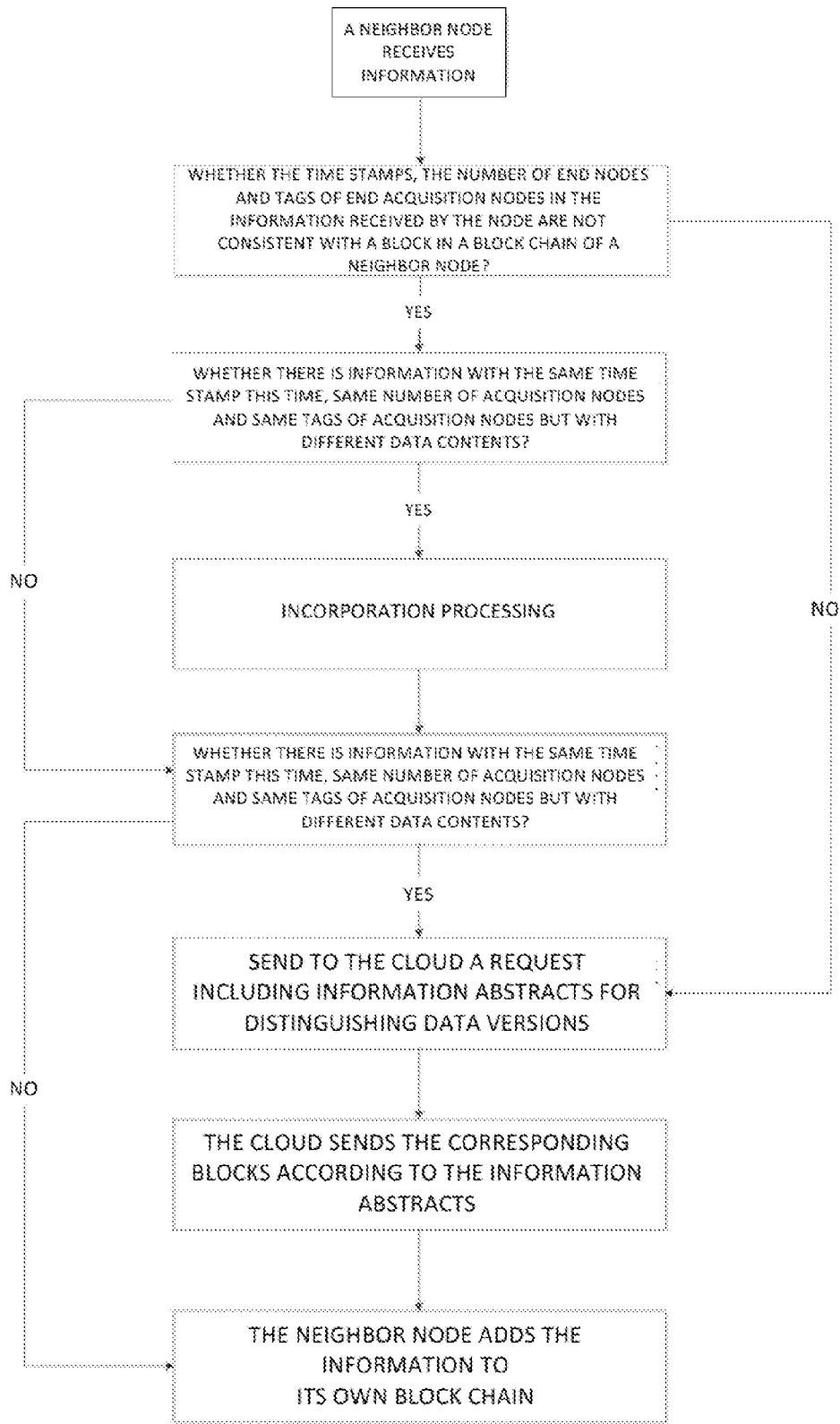
FIG. 5 is a flowchart of data update in the method for active information push by a network node according to the present invention.

FIG. 5 is a flowchart of data update in the method for active information push by a network node according to the present invention, as shown in FIG. 5.

In another example, the process of active push further involves the following data update operation:

Step one: a neighbor node receives information;

Step two: detect whether the time stamps, the number of end nodes and tags of end acquisition nodes in the information received by the node are not consistent with a block in a block chain of a neighbor node, if yes, proceed to step three; otherwise, proceed to step six;

Step three: detects whether there is information with the same time stamp this time and different acquisition node tags, if yes, proceed to step four; otherwise, proceed to step five;

Step four: perform incorporation processing, i.e., combines this information into a format of time stamp, the number of acquisition nodes, the tags of the acquisition nodes, data, the tags of the acquisition nodes data . . . . Wherein, the number of the acquisition nodes is determined according to the number of the tags of the acquisition nodes, each tag of acquisition node is followed immediately by its data;

Step five: detect whether there is information with the same time stamp this time, same number of acquisition nodes and same tags of acquisition nodes but with different data contents, if yes, proceed to step six; otherwise, proceed to step eight;

Step six: the neighbor node sends to the cloud a request including information abstracts for distinguishing data versions (please note that for hopping from step two, information abstracts refers to time stamp at the end of the block chain, the number of end acquisition nodes and tags of end acquisition nodes; as for hopping from step five, information abstracts refers to time stamp of this time, the number of acquisition nodes and tags of the acquisition nodes);

Step seven: the cloud sends the corresponding blocks as needed;

Step eight: the neighbor node adds the information to its own block chain.

Data update means distinguishing different data versions by way of recording information of each node such as application data and effective time through managing block chains. The so-called specific tag includes but not limited to time stamp and event driving.

With the present invention application, a highly efficient, reliable universal wireless network may be formed. Any node can read the data pushed and updated by each node in the network through this software within the definition range reachable for the network communication, and the definition of these data that can be read may be maintained by the network information management function.

Though the exemplary examples of the present invention application have been described and depicted, a person skilled in the art shall appreciate that various modifications and replacements made by made to the present application without departing from the spirit of the present patent. Moreover, many changes may be made to adapt particular cases to the teaching of the present invention without departing from the core concept of the present invention application. Therefore, the present invention application is not limited to the specific examples disclosed herein, and the present invention application may further include all examples and other equivalents within the scope of the present invention application.

What is claimed is:

1. A distributed network node operation system based on an operation control unit, the operation system operating on the network node and directly interacting with a data link layer, the operation system comprising: an application interface unit, a network information management unit, a file unit, a task scheduling unit and a device drive management unit, wherein, the application interface unit is a set of application interfaces, and packages services provided by the file unit, the task scheduling unit and the network information management unit into an interface for interacting with a protocol stack management unit;

the network information management unit is configured to interact with the data link layer to perform link scheduling for transmitting information and updating node data;

the file unit is configured to manage and store file information, organize and allocate space of a file storage device, and is responsible for file storage and protecting and searching stored files;

the task scheduling unit is configured to manage hardware resources;

the device drive management unit is configured to manage underlying device application drives, and to invoke different protocol stack library functions through different application drives, thus making a plurality of communication modes and protocols compatible;

data of the network node are stored in a manner of a block chain table, and the block chain table comprises a plurality of information abstracts, including time stamps, a number of acquisition nodes and tags of the acquisition nodes; and after a neighbor node receives the encapsulated information shared by the acquisition nodes, the network information management unit incorporates the time stamp of this time, the tags of the acquisition nodes and the data in the encapsulated information into the block chain in an order according to the time stamps; meanwhile actively pushes the received encapsulated information to another neighbor node according to the push path.

2. The distributed network node operation system according to claim 1, wherein, the application interface unit is configured to interface with a protocol stack management unit located in MAC, and the protocol stack management unit is configured to encapsulate a set of library functions of protocol stacks of different network protocols.

3. The distributed network node operation system according to claim 1, wherein, the operation system is incorporated with a LLC layer and a MAC layer.

4. The distributed network node operation system according to claim 1, wherein, the network information management unit comprises a data push sub-unit which is responsible for automotive push of information between nodes and a data update sub-unit which is responsible for update of data between the nodes.

5. The distributed network node operation system according to claim 1, wherein, the network information management unit is configured to, when the data acquired by the acquisition nodes are changed, control the acquisition nodes to plan a push path according to a routing table, encapsulate the data acquired this time, end information abstract in a block chain and the push path, and actively push the encapsulated information to a first neighbor node where network communication can reach, and write the data acquired this time into the end of the block chain of the acquisition nodes, and finally send the encapsulated information to a cloud.

6. The distributed network node operation system according to claim 1, wherein, the task scheduling unit comprises a processor management sub-unit responsible for allocating and controlling processors, a memory management sub-unit responsible for allocation and recycle of memory, and an IO (input and output devices) device management sub-unit responsible for allocation and manipulation of IO devices.

7. A method for a network node actively pushing information based on event driving, the network node operates an operation system which directly interacts with a data link layer, the operation system comprising: an application interface unit, a network information management unit, a file unit, a task scheduling unit and a device drive management unit, the method comprising the following steps of:

a) detecting whether data acquired by the node are changed;

b) when the data acquired by the node are changed, the acquisition node planning a push path according to a routing table through the network information management unit, and actively pushing data information to a first neighbor node where network communication can reach, wherein the active push of the data information is conducted after the data acquired this time, end information abstract in a block chain and the push path are encapsulated;

c) the node updating the data acquired this time to the file unit through the network information management unit; and d) after the first neighbor node receives the encapsulated information, incorporating the time stamp of this time, a tag of the acquisition node and the data in the encapsulated information into the block chain in an order according to the time stamps; meanwhile actively pushing the received encapsulated information to a second neighbor node according to the push path.

8. The method for actively pushing information according to claim 7, further comprising the step of: after a new node is added to the network, sending an update routing to a network-wide updated routing table.

9. The method for actively pushing information according to claim 7, wherein, after receiving the encapsulated data, the cloud distinguishes the encapsulated data according to information abstracts.

10. The method for actively pushing information according to claim 7, wherein, when the time stamp at the end of the block chain, a number of end acquisition nodes and tags of end acquisition nodes in the information received by the node are not consistent with a block in a block chain of a neighbor node, then the node sends to the cloud a request containing information abstracts for distinguishing information versions; after receiving the request, the cloud sends a block of a corresponding version according to the information abstracts and all blocks after the block to the node.

11. The method for actively pushing information according to claim 10, wherein, when the node receives more than two information versions with the same information abstract and these information versions have different contents, the node sends to the cloud a request containing information abstracts for distinguishing data versions; after receiving the request, the cloud sends a block of a corresponding version according to the information abstracts and all blocks after the block to the node.

12. The method for actively pushing information according to claim 7, wherein, the network information management unit converts an information push service provided by itself to an interface available to an upper-layer application program through the application interface unit.

13. The method for actively pushing information according to claim 12, wherein, the application interface unit invokes a protocol stack management unit in a MAC layer to invoke different network protocols, so as to support information push of underlying devices of different communication modes and networking modes.

* * * * *